United States Patent [19]

Kukin

[11] Patent Number: 5,034,114

[45] Date of Patent: Jul. 23, 1991

[54] ACID NEUTRALIZING COMBUSTION ADDITIVE WITH DETERGENT BUILDER

[76] Inventor: Ira Kukin, 45 Edgemont Rd., West Orange, N.J. 07052

[21] Appl. No.: 386,122

[22] Filed: Jul. 28, 1989

[51] Int. Cl.$^5$ ............................................. C10G 45/08
[52] U.S. Cl. .................................. 208/48 AA; 208/47; 208/348; 44/603; 44/457; 44/580; 252/87; 252/40; 252/389.1; 252/389.61; 252/389,62; 252/8.3; 423/421; 423/425; 423/DIG. 8; 585/950
[58] Field of Search .................... 208/48 AA, 47, 348; 585/950; 44/51, 457, 603, 580; 252/389.61, 389.62, 389.3, 389.31, 389.2, 389.24, 389.4, 389.41, 83, 87; 423/421, 423, DIG. 8

[56] References Cited

U.S. PATENT DOCUMENTS

| | | | |
|---|---|---|---|
| 1,925,088 | 9/1933 | Andrus | 252/389.61 |
| 2,458,049 | 1/1949 | Bloch et al. | 585/950 |
| 3,275,566 | 9/1966 | Langguth | 252/389.62 |
| 3,617,478 | 11/1971 | King, Jr. | 208/48 AA |
| 3,617,479 | 11/1971 | King, Jr. | 208/48 AA |
| 4,681,737 | 7/1987 | Walker et al. | 252/389.62 |
| 4,717,495 | 1/1988 | Hercamp et al. | 252/389.62 |
| 4,842,617 | 6/1989 | Kukin | 44/51 |

FOREIGN PATENT DOCUMENTS 0267673 5/1988 European Pat. Off. ....... 208/48 AA

Primary Examiner—Helane E. Myers
Attorney, Agent, or Firm—James & Franklin

[57] ABSTRACT

Boiler fouling, particularly in air preheater section, is minimized by combining with a substance designed to neutralize acids a detergent builder such as the sodium, potassium and ammonium phosphates, polyphosphates, silicates, metasilicates, borates, metaborates and sesquicarbonates.

21 Claims, No Drawings

ACID NEUTRALIZING COMBUSTION ADDITIVE WITH DETERGENT BUILDER

The present invention relates to a method to minimize boiler air preheater fouling and provide a rapid means to clean air preheaters that have been in service for extended periods, thereby decreasing unit down time and extending the unit service time at considerable savings to the utility or industrial boiler user.

A major problem associated with the burning of coal and oil fossil fuels in steam generating boilers has been the condensation of sulfuric acid onto the cooler boiler surfaces, thereby promoting metal corrosion and forming a sticky surface for the ash present in the fuel to adhere to. The sulfuric acid results from the oxidation of the sulfur dioxide within the boiler hot zones, and mixing of the derived sulfur trioxide with moisture or water in the boiler cold zones causing condensation of sulfuric acid. The recent trend towards the use of low sulfur content fuels has helped reduce the formation of sulfur trioxide within the boiler and subsequent condensation to sulfuric acid, but sufficient sulfur is present in even these fuels to present major problems in boiler operation.

In a typical industrial or utility boiler, the flue gas produced by a coal or oil fired boiler passes successively from the furnace through the various steam generating tube sections, an air preheater, an electrostatic precipitator (usually, but not exclusively, for coal fired units), a stack, and ultimately passes into the atmosphere.

Incorporated into the design of every modern steam generating unit is a means to attempt to prevent sulfuric acid condensation and deposit buildup within the air preheater. This is accomplished by extracting some of the steam from the system and using it to preheat the air, before it enters the air preheaters, from ambient air temperatures to 175°-200° F. typically. Although the use of these air-preheating "steam coils" does increase the air temperatures to the preheaters, and with it the gas temperatures exiting the preheaters, the increase is never sufficient to eliminate sulfuric acid condensation within the preheater. Additionally, use of the air preheating steam coils oftentimes causes boiler operational problems when one or more of these tubes burst and water is emitted into the air preheater, which in turn causes rapid air preheater pluggage. The use of air preheating also utilizes energy, and is costly on that account.

The temperature of the gases leaving the steam generating tube sections is typically 600°-700° F., too high a temperature for acid condensation. In the air preheater, however, the flue gas is cooled by incoming air to the furnace and exits the air preheater at typical temperatures of 250°-350° F. when such air-heating steam coils are in service. That temperature, although raised by the action of the steam coils, is nevertheless cool enough to allow the condensation of sulfur trioxide to sulfuric acid, although to a lesser degree than if the steam coils were not used. Although these temperatures are higher than the acid dewpoint temperature (that temperature at which condensation starts) the metal of the air preheater is subjected to both this gas temperature and that of the colder, moving air being forced through the air preheater to the furnace. Thus, the air preheater metal temperature lies somewhere between the temperature of the incoming air and the outgoing gas, and usually allows for sulfuric acid condensation within the air preheaters. The sulfur trioxide escaping the air preheater without condensing either condenses in the stack, or outside in the atmosphere producing white clouds of sulfuric acid as well as other conditions often referred to as acid smut, and also being a source of acid rain. Hence elimination of sulfur trioxide condensation will reduce environmental problems.

One approach to minimizing air preheater corrosion and fouling without eliminating sulfur trioxide condensation is to introduce acid neutralization substances into the unit before the air preheaters to neutralize the condensing sulfuric acid and render it non-corrosive. Many different substances have been proposed to this end, including magnesium oxide, the latter generally introduced as a powder.

Although the use of magnesium oxide as an acid neutralizing substance does help to neutralize the gaseous sulfur trioxide ($SO_3$) or the condensed sulfuric acid ($H_2SO_4$) at the desired location, problems were discovered in field use preventing the use of magnesium oxide by itself. These problems were related to the flow properties of the magnesium oxide, and its ability to absorb water and plug the air preheater elements. Magnesium oxide, by itself, easily clogs distribution hoppers and transport lines and cannot be fed uniformly or continuously at the desired low treatment rates, no matter what mechanical changes are made to the powder feed equipment. Moreover, in the presence of moisture (either from high relative humidity, or moisture present in the gas stream, or a steam coil leak), the magnesium oxide hardens into a cement-like mass. If this hardening occurs in the injection equipment, oftentimes feed augers and other control mechanisms are broken and equipment failure occurs. If this hardening occurs in the boiler, large hard encrustations are formed on the air preheater metal elements preventing adequate gas/air flow and forcing the unit out of service for cleaning. Other acid neutralizing substances are magnesium hydroxide and magnesium carbonate, which may be used alone or in combination with one another or with magnesium oxide.

The powder flow/distribution problem and, to a lesser degree, the absorbance of water and product hardening problem can frequently be overcome by adding flow improvement agents and dehydrating agents to the magnesium oxide. Various flow improving and dehydrating agents have been utilized, typically talcs, vermiculites, pyrophilites, and high-surface silicas, generally admixed with acid-neutralizing enhancing agents, such as those of the sodium and potassium carbonate and bicarbonate family, as well as sodium aluminates, or combinations thereof. With these additions to the magnesium oxide, uninterrupted flow of the powdered material at low treatment rates has been obtained in field use, resulting in uniform laydown of a magnesium oxide coating on the air preheater surfaces.

In spite of these improvements in the storage, handling and effectiveness in such modifications made to the magnesium oxides, there remain problems associated with the use of these formulations containing the known modifiers, because the product may still have an affinity for water, although not nearly as severe as with magnesium oxide alone. Moreover, when excessive moisture is present in the flue gas or when a steam coil ruptures, the air preheater baskets eventually plug with hard encrustations. To clean these baskets, the unit has to be removed from service and high pressure water or steam injected by a hand lance directly at the encrustations. This method of cleaning the air preheater baskets is normal, and also is used when no additive treatment has been used to clean the ash and unburned carbon particle's which harden on the cold side preheater elements following sulfuric acid condensation resulting in the sticky surface for the ash to adhere to. This method of cleaning is undesirable because, in addition to the necessity to remove the unit from service at considerable cost and scheduling difficulty, the laminated metal elements comprising the baskets are oftentimes destroyed by the high water pressure involved.

I have discovered that the use of inorganic compounds of the class often referred to as detergent builders, either in place of or in addition to the sodium and/or potassium bicarbonate or carbonate, facilitates air preheater cleaning such that the baskets can be cleaned down to bare metal with simple water hosing, significantly decreasing boiler shut-down time and eliminating the need for high pressure water or steam cleaning. The end result is less down time to obtain a clean air preheater without damaging the costly metal components.

Typical of the high temperature detergent builders useful in this application are as follows:

1. Sodium phosphate and the various other phosphates including sodium polyphosphates, sodium dihydrogen phosphate and sodium monohydrogen phosphates. Some specific examples, selected because of their availability and cost, and their chemical nomenclature are as follows:
   a. Sodium hexametaphosphate, SHMP, also sodium polymetaphosphate, also "Hy-Phos" $(NaPO_3)_x$—also sodium metaphosphate, also Graham's salt, Calgon, Giltex, Quadrafos, Micromet $(NaPO_3)$.
   b. Sodium dihydrogen phosphate; sodium phosphate, monobasic, sodium biphosphate $H_2NaO_4P$.
   c. Sodium monohydrogen phosphate, sodium phosphate dibasic, $HNa_2O_4P$.
   d. Sodium acid pyrophosphate (disodium dihydrogen pyrophosphate, $H_2Na_2O_7P_2$).
   e. Sodium hypophosphate $Na_4O_6P_2$.
   f. Sodium phosphate, tribasic, $Na_3O_4P$, trisodium-phosphate (TSP; Oakite).
   g. Sodium trimetaphosphate, $Na_3O_9P_3$.
   h. Sodium tripolyphosphate, STP, STPP, $Na_5P_3O_{10}$, also $Na_5O_{10}P_3$; $Na_5P_3O_{10}$.
   i. Tetrasodium pyrophosphate, TSPP, $Na_4P_2O_7$.
2. Sodium metasilicate, $Na_2O_3Si$; also sodium silicate, $Na_2SiO_3$; $Na_6Si_2O_2$.
3. Sodium metaborates, $BNaO_2$; also sodium borate, $B_4Na_2O_7$ (borax; Jaikin).
4. Sodium sesquicarbonate (trona) $C_2HNa_3O_6$.

The above substances have the desirable characteristic that they do not decompose at the air heater inlets (where the neutralizing powder is added) and where temperatures of the order of 500° F. to 1200° F. may exist. Such high temperatures rule out the use of organic detergents and surfactants and necessitate the use of an inorganic material.

Corresponding potassium and ammonium salts can, as a general matter, be used instead of or in conjunction with the sodium detergent builder salts. Readily available effective potassium salts are tripotassium phosphate and dipotassium phosphate. Among the most readily available effective ammonium salts are ammonium phosphate dibasic, $H_9N_2O_4P$; $(NH_4)_2HPO_4$, ammonium phosphate monobasic, $H_6NO_4P$; $(NH_4)H_2PO_4$ and ammonium phosphite, $H_9N_2O_3P$; $(NH_4)H_2PO_3$. The ammonium salts have a greater tendency to decompose at elevated temperatures. While the magnesium and ammonium salts are best introduced in the form of a powder, the potassium salts can well be introduced in liquid form.

The detergent builder is preferably introduced to the boiler outlet or air heater inlet in the form of a powder, but it is also possible to use a liquid spray or a liquid slurry spray. When the material is introduced in liquid form the potassium salts of the polyphosphates, polysilicates or polyborates have the advantage that they generally either are liquid or readily soluble in a water medium, and for certain heavy duty applications, whether the additive is injected as a powder, aqueous liquid or slurry, the potassium salts often function in an improved manner when compared with the corresponding sodium salts.

The above detergent builders were discovered to be best after extensive laboratory testing simulating typical field conditions followed by pilot testing on a small gas fired boiler with sulfuric acid sprayed onto an air cooled, stationary air preheater. These substances are also products readily commercially available at practical cost and are therefore cost-effective solutions to the problem.

In the laboratory, powder flowability and acid neutralization tests were performed, followed by oven hardening and washability tests. All tests were designed to differentiate those compounds which flowed freely and didn't harden significantly on the metal air preheater, while still providing sufficient acid neutralization to prevent corrosion.

The test methods used to determine the uniqueness and applicability of the chemical compositions discussed herein were as follows:

1) Laboratory Tests—all of the samples were subjected to the following tests performed in the laboratory:
   a) Flowability Test—this test measures the time required for a known weight of material to flow through two standard funnels, and the shape of the pile of this material after flow has stopped.
   b) Acid Neutralization Test—this test measures the quantity of the material being tested necessary to neutralize a coal fly ash containing a known amount of sulfuric acid. The acetone extraction method ATI-2 was used in reverse, starting with a known fly ash/formula tested mixture, and titrating with sulfuric acid to neutrality.
   c) Oven Hardening Test—this ash test was performed in a laboratory furnace set at a temperature to simulate those encountered in an air preheater of a normal 150–300MW utility boiler. Five grams of each formula was placed in a crucible and baked at 500° F. for five hours, then allowed to cool. The samples were then visually inspected and prodded for hardness.
   d) Washability Test—this test was performed on the same sample as the oven hardening test to determine the ease in which the samples could be washed off of the sides of the crucible. The purpose of this was to predict which formulas would facilitate air preheater cleaning, and which could make cleaning more difficult. Tap water was used to wash the samples, and the ease in which the sample dislodged from the crucible walls was noted.

2) Pilot Test—a small oil fired boiler was constructed for pilot testing, with a stationary tubular air preheater constructed to simulate those encountered in a typical 150-300MW unit. Pilot testing consisted of continuous treatment of the different formulas at constant rates at the boiler outlet at 650°-670° F. Just upstream of this point, sulfuric acid was sprayed into the gas stream at a constant rate volumetrically equivalent to what is normally oxidized in a typical utility boiler. The stationary preheater was fan cooled to typical temperatures obtained in a utility unit, making the pilot unit comparable to real units and useful in product comparison. The following pilot tests were performed:

a) Pluggage Test—using the equipment above, this test was performed very much like the laboratory oven hardening test. After twenty-four hours of continuous injection, the unit was removed from service and the metal blades inspected with observations on the type of deposits noted.

b) Washability Test—performed on the deposits of the metal fan blades much like the washability tests on the laboratory crucible samples, each test run was completed by hosing down the fan blades and noting the ease of dislodgement of the deposits.

The different formulas were first tested in the laboratory, then in the pilot unit. Test results are summarized in Table I, and discussed below.

TABLE I

| SAMPLE | | | FLOWABILITY | | LABORATORY TESTS | | | PILOT TESTS | | |
|---|---|---|---|---|---|---|---|---|---|---|
| | | | | | Acid Neutralization | Oven Hardening | | Air Preheater | | |
| CLASS | EXAMPLE | FORMULA | Angle of Repose [°] | Discharge Time [Seconds] | [MgH$_2$SO$_4$/g Sample] | [Desc. of Dep.] | Washability [Ease/Water Wash] | Pluggage [Desc. of Deposit] | Washability [Ease/Water Wash] |
| I | 1 | MgO | 54° 20' | wouldn't discharge from funnel without excessive tapping | 1.2 | very hard-cementlike | couldn't be washed off sides of crucible | very hard-cementlike | couldn't be washed off metal |
| II | 2 | MgO(87%) + Sodium Bicarbonate(5%) + Urea(2%) + Flow Aids(6%) | 50° 00' | 20 | 2.6 | very hard-cementlike | couldn't be washed off sides of crucible | very hard-cementlike | couldn't be washed off metal |
| | 3 | MgO(82%) + Sodium Bicarbonate(10%) + Urea(2%) + Flow Aids(6%) | 48° 20' | 18 | 3.1 | very hard-cementlike | couldn't be washed off sides of crucible | very hard-cementlike | couldn't be washed off metal |
| | 4 | MgO(72%) + Sodium Bicarbonate(20%) + Urea(2%) + Flow Aids(6%) | 44° 00' | 8 | 3.7 | very hard | washed off crucible with much difficulty required hot water | very hard | very difficult to wash off metal-did not dislodge entirely |
| | 5 | MgO(62%) + Sodium Bicarbonate(30%) + Urea(2%) + Flow Aids(6%) | 42° 40' | 7 | 5.2 | very hard | washed off crucible with much difficulty required hot water | hard | very difficult to wash off metal-didn't dislodge entirely |
| | 6 | MgO(57%) + Sodium Bicarbonate(35%) + Urea(2%) + Flow Aids(6%) | 40° 40' | 7 | 6.7 | hard | washed off crucible with much difficulty required hot water | hard | very difficult to wash off metal-didn't dislodge entirely |
| III | 7 | MgO(72%) + Sodium Bicarbonate(10%) + Sodium Tripolyphosphate(10%) + Urea(2%) + Flow Aids(6%) | 43° 20' | 7 | 3.6 | semi hard | dislodged off crucible walls in chunks | semi soft | washed off metal entirely but required more time |
| | 8 | MgO(72%) + Sodium Bicarbonate(10%) + Sodium Hexametaphosphate(10%) + Urea(2%) + Flow Aids(6%) | 43° 20' | 7 | 3.7 | semi soft | dislodged off crucible walls in chunks | soft and friable | washed off metal entirely but required more time |
| | 9 | MgO(72%) + Sodium Bicarbonate(10%) + Tetrasodium Pyrophosphate Anhydrous(10%) + Urea(2%) + Flow Aids(6%) | 43° 00' | 7 | 3.6 | soft | dislodged off crucible walls in small pieces and powder | soft and friable | washed off metal entirely-not as difficult |
| IV | 10 | MgO(87%) + Sodium Tripolyphosphate(5%) + Urea(2%) + Flow Aids(6%) | 46° 40' | 12 | 2.4 | hard | washed off crucible walls in chunks, but with much difficulty | hard | very difficult to wash off metal-didn't dislodge entirely |
| | 11 | MgO(82%) + Sodium Tripolyphosphate(10%) + Urea(2%) + Flow Aids(6%) | 44° 40' | 8 | 2.8 | semi hard | dislodged off crucible walls in chunks | semi soft | washed off metal entirely but required more time |
| | 12 | MgO(72%) + Sodium Tripolyphosphate(20%) + Urea(2%) + Flow Aids(6%) | 42° 40' | 7 | 3.6 | semi hard | dislodged off crucible walls in chunks | semi soft | easily washed off metal with water |
| | 13 | MgO(62%) + Sodium Tripolyphosphate(30%) + Urea(2%) + Flow Aids(6%) | 43° 00' | 6 | 4.7 | semi hard | dislodged off crucible walls in small pieces | soft | easily washed off metal with water |
| | 14 | MgO(57%) + Sodium Tripolyphosphate(35%) + Urea(2%) + Flow Aids(6%) | 42° 20' | 6 | 5.7 | semi hard | dislodged off crucible walls in small pieces | soft | easily washed off metal with water |
| V | 15 | MgO(87%) + Sodium Hexametaphosphate(5%) + | 46° 20' | 12 | 2.9 | semi hard | washed off crucible with much difficulty | hard | washed off metal entirely-re- |

TABLE I-continued

| SAMPLE | | | FLOWABILITY | | LABORATORY TESTS | | | PILOT TESTS | |
|---|---|---|---|---|---|---|---|---|---|
| CLASS | EXAMPLE | FORMULA | Angle of Repose [°] | Discharge Time [Seconds] | Acid Neutralization [MgH₂SO₄/g Sample] | Oven Hardening [Desc. of Dep.] | Washability [Ease/Water Wash] | Air Preheater Pluggage [Desc. of Deposit] | Washability [Ease/Water Wash] |
| | 16 | Urea(2%) + Flow Aids(6%) + MgO(82%) + Sodium Hexametaphosphate(10%) + Urea(2%) + Flow Aids(6%) | 45° 00' | 9 | 3.1 | semi soft | required hot water dislodged off crucible walls in chunks | semi soft | quired more time washed off metal entirely-required more time |
| | 17 | MgO(72%)Sodium Hexametaphosphate(20%) + Urea(2%) + Flow Aids(6%) | 43° 20' | 7 | 3.7 | semi soft | dislodged off crucible walls in chunks | soft and friable | easily washed off metal with water |
| | 18 | MgO(62%) + Sodium Hexametaphosphate(30%) + Urea(2%) + Flow Aids(6%) | 42° 40' | 6 | 4.1 | semi soft | dislodged off crucible walls in chunks | soft and friable | easily washed off metal with water |
| | 19 | MgO(57%) + Sodium Hexametaphosphate(35%) + Urea(2%) + Flow Aids(6%) | 42° 40' | 6 | 5.4 | semi soft | dislodged off crucible walls in small pieces | soft and friable | easily washed off metal with water |
| VI | 20 | MgO(87%) + Tetrasodium Pyrophosphate Anhydrous-(5%) + Urea(2%) + Flow Aids -(6%) | 44° 40' | 10 | 2.5 | semi soft | dislodged off crucible walls in small pieces | semi soft | washed off metal entirely-required more time |
| | 21 | MgO(82%) + Tetrasodium Pyrophosphate Anhydrous(10%) + Urea(2%) + Flow Aids(6%) | 43° 20' | 8 | 2.9 | soft | dislodged off crucible walls in small pieces and powder | soft | easily washed off metal with water |
| | 22 | MgO(72%) + Tetrasodium Pyrophosphate Anhydrous-(20%) + Urea(2%) + Flow Aids-(6%) | 42° 40' | 7 | 3.6 | soft breaks into powder | dissolved off crucible walls rapidly | very little deposit-what existed was soft/crumbly | easily washed off metal with water |
| | 23 | MgO(62%) + Tetrasodium Pyrophosphate Anhydrous-(30%) + Urea(2%) + Flow Aids-(6%) | 42° 20' | 6 | 4.5 | soft breaks into powder | dissolved off crucible walls rapidly | very little deposit-soft/crumbly | easily washed off metal with water |
| | 24 | MgO(57%) + Tetrasodium Pyrophosphate Anhydrous-(35%) + Urea(2%) + Flow Aids-(6%) | 41° 40' | 6 | 5.2 | soft breaks into powder | dissolved off crucible walls rapidly | very little deposit-what remained was soft/crumbly | easily washed off metal with water |

Twenty-four (24) different formulations were tested, listed as examples 1-24 in Table I. These tests were subdivided and classed in Table I according to type of formulation according to the following (in each example a standardized flow aid combination was used at 6% and urea was present at 2%. The use of the flow aids and the urea do not impact upon the combustion or slagging results):

Class I—MgO alone (100%) (example 1).

Class II—MgO and sodium bicarbonate varied, starting with 5%, but as high as 35% (Examples 2-6).

Class III—MgO held constant (72%), sodium bicarbonate held constant (10%) with different detergent builders, described below under Class IV, V, and VI per test at 10% (examples 7-9).

Class IV—MgO and sodium tripolyphosphate, STPP ($Na_5O_{10}P_3$; $Na_5P_3O_{10}$) varied in 5-10% increments (examples 10-14).

Class V—MgO and sodium hexametaphosphate, also called sodium polymetaphosphate, Graham's salt, Calgon, Giltex, Quadrafos; Micromet ($NaPO_3$) varied in 5-10% increments (examples 15-19).

Class VI—MgO and Tetrasodium Pyrophosphate Anhydrous, TSPP or sodium pyrophosphate ($Na_4O_7P_2$) varied in 5-10% increments (examples 20-24).

Note: In all tests of Classes II-VI, a flow improvement mixture was held constant at 6%. The test from Class I was performed without any flow improver. "Flow aids" are combinations of talc, vermiculite, pyrophylite, perlite, silica gel, diatomaceous earth and other flow improvers known to the trade generally with a particle size of between 80-200 microns. The flow aids are added to improve the free flowability of the powder and the stability of the powders in storage, but do not impact upon the combustion results.

Class I—example MgO 100%

The magnesium oxide performed poorly in all of the tests, except the laboratory acid neutralization test where the 100% concentration of the basic MgO was effective in neutralizing the sulfuric acid. The MgO powder would not flow, however, and formed extremely hard deposits in both the lab and pilot tests which could not be washed off.

Class II

Example 2 MgO 87%, sodium bicarbonate 5%, flow aids and urea 8%

Example 3 MgO 82%, sodium bicarbonate 10%, flow aids and urea 8%

Example 4 MgO 72%, sodium bicarbonate 20%, flow aids and urea 8%

Example 5 MgC 62%, sodium bicarbonate 30%, flow aids and urea 8%

Example 6 MgC 57%, sodium bicarbonate 35%, flow aids and urea 8%

All tests in this class showed improved flowability over magnesium oxide alone, but results still were not satisfactory. For all formulas, the lab and pilot deposit test showed very hard encrustations which were difficult to dislodge. Examples 2 and 3, with the higher MgO concentrations, show that the deposits were so hard that they couldn't be dislodged, especially from the metal in the pilot tests. As the sodium bicarbonate content was increased, and magnesium oxide content decreased, the powder flowability improved and the deposits were somewhat softer, but still were very difficult to dislodge from the crucible and metal. Also, the tests at the lower MgO contents (Examples 5 and 6) showed that the sulfuric acid was not being neutralized to the point where metal corrosion would not be a problem. Only results of Example 4 could be considered acceptable, and only marginally so due to the difficulty encountered in washing off the deposit.

Class III

Example 7 MgO 72%, sodium bicarbonate 10%, sodium tripolyphosphate 10%, urea and flow aids 8%

Example 8 MgO 72%, sodium bicarbonate 10%, sodium hexametaphosphate 10%, urea and flow aids 8%

Example 9 MgO 72%, sodium bicarbonate 10%, tetrasodium pyrophosphate anhydrous 10%, urea and flow aids 8%

In these tests, the best example from the Class II tests (Example 4) was used as the control and the percentage of sodium bicarbonate reduced 50% and replaced with one of the three detergent builders. Results showed that replacing 10% of the sodium bicarbonate with any of the three detergent builders softened the accumulated deposit, and permitted easier washing. For all three tests, the powder flowability and acid neutralization abilities were not changed significantly. Of the three examples, the sodium hexametaphosphate and the tetrasodium pyrophosphate anhydrous of Examples 8 and 9 respectively gave the softer, more friable deposit.

Class IV

Example 10 MgO 87%, sodium tripolyphosphate 5%, urea and flow aids 8%

Example 11 MgO 82%, sodium tripolyphosphate 10%, urea and flow aids 8%

Example 12 MgO 72%, sodium tripolyphosphate 20%, urea and flow aids 8%

Example 13 MgO 62%, sodium tripolyphosphate 30%, urea and flow aids 8%

Example 14 MgO 57%, sodium tripolyphosphate 35%, urea and flow aids 8%

These tests were performed the same as the Class II tests, with sodium tripolyphosphate replacing all of the sodium bicarbonate. The sodium tripolyphosphate performed much better in softening the deposit, especially on the air preheater metal of the pilot tests. Example 12, with MgO at 72% and the sodium tripolyphosphate at 20%, gave the best overall results, reducing the powder angle of repose to 42° 40' with a funnel discharge time of 7 seconds while still adequately neutralizing the acid. At higher sodium tripolyphosphate and lower magnesium oxide concentrations, the deposit was softened considerably, but the sulfuric acid was not adequately neutralized and therefore considered not acceptable.

Class V

Example 15 MgO 87%, sodium hexametaphosphate 5%, flow aids 8%

Example 16 MgO 82%, sodium hexametaphosphate 10%, flow aids 8%

Example 17 MgO 72%, sodium hexametaphosphate 20%, flow aids 8%

Example 18 MgO 62%, sodium hexametaphosphate 30%, flow aids 8%

Example 19 MgC 57%, sodium hexametaphosphate 35%, flow aids 8%

These tests were again performed the same as the Class II tests, this time with sodium hexametaphosphate replacing the sodium bicarbonate. The sodium hexametaphosphate worked well, with as little as 10% (Example 16) giving good overall results. The best results were found in Examples 17 and 18, however, with 20% and 30% respectively of the sodium hexametaphosphate improving flowability, ease of metal and crucible cleaning, and still providing adequate acid neutralization. Reducing the MgO content an additional 5% (Example 19) did not significantly improve flow nor ease the deposit wash and increased the free acid content above the desired upper limit of 5mg $H_2SO_4$ per gram of sample.

Class VI

Example 20 MgO 87%, tetrasodium pyrophosphate anhydrous 5%, urea and flow aids 8%
Example 21 MgO 82%, tetrasodium pyrophosphate anhydrous 10%, urea and flow aids 8%
Example 22 MgO 72%, tetrasodium pyrophosphate anhydrous 20%, urea and flow aids 8%
Example 23 MgO 62%, tetrasodium pyrophosphate anhydrous 30%, urea and flow aids 8%
Example 24 MgO 57%, tetrasodium pyrophosphate anhydrous 35%, urea and flow aids 8%

These tests were performed the same as Class II, IV, and V tests using the tetrasodium pyrophosphate anhydrous as the detergent builder. This series of tests produced the best results. The deposits were made very soft, even at the lowest amount of the detergent builder. Increasing the tetrasodium pyrophosphate anhydrous content to 10% made air preheater washing easy, with the deposit breaking off the preheater metal in very small, finely sized chunks. The acid neutralization properties were good, up to a minimum MgO content of 62%. The powder flowed freely for all the different concentrations, especially Examples 21-24.

The examples cited were generally commercially available but this should not imply that other materials would not be suited. Generally the higher the molecular weight of the additive used, the more effective it is because such detergent builders depend upon the longer chain molecules for their effectiveness.

The additives of the present invention are preferably used in the same amounts relative to the amount of fuel as have been found appropriate in the prior art use of magnesium oxide additives, preferably combined with conventional other components such as urea, flow aids, and sodium bicarbonate, with the proportion by weight of magnesium oxide in the combination preferably remaining within the ranges used in the prior art. For example, the relative proportions of MgO and fuel set forth in my patent application Ser. No. 083,161, filed Aug. 10, 1987 and entitled "Combustion Control By Addition of Magnesium Compounds of Particular Particle Sizes", the disclosure of which is herein incorporated by reference, may be considered to be appropriate, and Table I of this disclosure indicates the range of relative proportions of the several components of the additives here disclosed. In general, the total additive may be provided within a range of 1.0-20 pounds per 8,000 pounds of fuel oil (the equivalent of about 1,000 gallons of fuel oil), with the detergent builder constituting between 5 and 35% by weight of the total additive. The ratio of MgO to detergent builder may well vary widely from installation to installation, since the amount of MgO provided is directly related to the amount of sulfur in the fuel and the amount of excess air present, which determines the amount of $SO_3$ derived from the sulfur, whereas the amount of detergent builder required is that which is appropriate to provide an effective film on the walls of the portion of the boiler involved. Likewise, the optimal detergent builder to be used may vary from installation to installation, since each boiler situation and environment often requires individual treatment.

While but a limited number of embodiments have been here specifically disclosed, it will be apparent that many variations may be made with respect thereto, all within the scope of the instant invention as defined in the following claims.

I claim:

1. A flue gas additive to minimize fouling in a boiler unit by being introduced into the flue gas passage thereof, comprising one or more acid neutralizing substances from the group consisting of magnesium oxide, hydroxide and carbonate and mixtures thereof and one or more inorganic detergent builders.

2. A flue gas additive to minimize fouling in a boiler unit by being introduced into the flue gas passage thereof, comprising one or more acid neutralizing substances from the group consisting of magnesium oxide, hydroxide and carbonate and mixtures thereof and a detergent builder comprising one or more substances from the group consisting of sodium, potassium and ammonium phosphates, polyphosphates, silicates, metasilicates, borates, metaborates and sesquicarbonates.

3. The combination of either of claims 1 or 2, in which said acid neutralizing substance comprises one or more substances from the group consisting of magnesium oxide, hydroxide and carbonate.

4. The combination of claim 3, in which said detergent builder substances are present in an amount between 5-35% by weight of said combination.

5. The combination of either claims 1 or 2, in which said detergent builder substances are present in an amount between 5-35% by weight of said combination.

6. The combination of claim 2, in which said detergent builder substance comprises sodium tripolyphosphate.

7. The combination of claim 6, in which said sodium tripolyphosphate is present in an amount between 5-35% by weight of said combination.

8. The combination of claim 2, in which said detergent builder substance comprises tetrasodium pyrophosphate.

9. The combination of claim 8, in which said tetrasodium pyrophosphate is present in an amount between 5-35% by weight of said combination.

10. The combination of claim 2, in which said detergent builder substance comprises sodium hexametaphosphate.

11. The combination of claim 10, in which said sodium hexametaphosphate is present in an amount between 5-35% by weight of said combination.

12. The method of minimizing fouling of a boiler part which comprises introducing into the flue gas passage of said boiler upstream of said part an additive comprising, in combination, one or more acid neutralizing substances from the group consisting of magnesium oxide, hydroxide and carbonate and mixtures thereof and one or more inorganic detergent builders.

13. The method of minimizing fouling of a boiler part which comprises introducing into the flue gas passage of said boiler upstream of said part an additive comprising, in combination, one or more acid neutralizing substances from the group consisting of magnesium oxide, hydroxide and carbonate and mixtures thereof and a detergent builder comprising one or more substances from the group consisting of sodium, potassium and ammonium phosphates, polyphosphates, silicates, metasilicates, borates, metaborates and sesquicarbonates.

14. The method of claim 12 or 13, in which said detergent builder substances are present in an amount between 5-35% by weight of said combination.

15. The method of claims 12 or 13, in which said detergent builder substances are present in an amount between 5-35% by weight of said combination.

16. The method of claim 13, in which said detergent builder substance comprises sodium tripolyphosphate.

17. The method of claim 16, in which said sodium tripolyphosphate is present in an amount between 5-35% by weight of said combination.

18. The method of claim 13, in which said detergent builder substance comprises tetrasodium pyrophosphate.

19. The method of claim 18, in which said tetrasodium pyrophosphate is present in an amount between 5-35% by weight of said combination.

20. The method of claim 13, in which said detergent builder substance comprises sodium hexametaphosphate.

21. The method of claim 20, in which said sodium hexametaphosphate is present in an amount between 5-35% by weight of said combination.

* * * * *